US010423695B2

United States Patent
Cho et al.

(10) Patent No.: US 10,423,695 B2
(45) Date of Patent: *Sep. 24, 2019

(54) SYSTEM, METHOD, AND RECORDING MEDIUM FOR MIRRORING MATRICES FOR BATCHED CHOLESKY DECOMPOSITION ON A GRAPHIC PROCESSING UNIT

(71) Applicant: International Business Machines Corporation, Armonk, NY (US)

(72) Inventors: Minsik Cho, Austin, TX (US); David Shing-ki Kung, Chappaqua, NY (US); Ruchir Puri, Baldwin Place, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,148

(22) Filed: Mar. 8, 2018

(65) Prior Publication Data

US 2018/0196779 A1    Jul. 12, 2018

Related U.S. Application Data

(63) Continuation of application No. 15/199,772, filed on Jun. 30, 2016, now Pat. No. 9,984,041.

(51) Int. Cl.
*G06F 17/16* (2006.01)
*G06F 5/01* (2006.01)
(Continued)

(52) U.S. Cl.
CPC .............. *G06F 17/16* (2013.01); *G06F 5/015* (2013.01); *G06F 17/12* (2013.01); *G06T 1/20* (2013.01); *G06T 1/60* (2013.01); *G06F 2205/00* (2013.01)

(58) Field of Classification Search
CPC ...................................................... G06F 17/16
See application file for complete search history.

(56) References Cited

U.S. PATENT DOCUMENTS 9,984,041 B2 *   5/2018   Cho .................. G06F 17/16
2005/0071412 A1   3/2005   Gustavson et al.
(Continued)

FOREIGN PATENT DOCUMENTS

CN          104794102 A        7/2015

OTHER PUBLICATIONS

United States Notice of Allowance dated Jan. 26, 2018 in U.S. Appl. No. 15/199,772.
(Continued)

*Primary Examiner* — Chuong D Ngo
(74) *Attorney, Agent, or Firm* — Kevin Michael Jordan, Esq.; McGinn IP Law Group, PLLC

(57) ABSTRACT

A batched Cholesky decomposition method, system, and non-transitory computer readable medium for a Graphics Processing Unit (GPU), include mirroring a second problem matrix of a second problem to a first problem matrix of a first problem as paired matrices and shifting the second problem by N+1, combining the first problem matrix and the mirrored second problem matrix into one matrix of (N+1)×N, and reading the fixed size data length of the one square matrix with a fixed data interval for both the first problem and the second problem.

20 Claims, 5 Drawing Sheets

(51) Int. Cl.
*G06F 17/12* (2006.01)
*G06T 1/20* (2006.01)
*G06T 1/60* (2006.01)

(56) References Cited

U.S. PATENT DOCUMENTS

2006/0173947 A1 8/2006 Gustavson et al.
2006/0265445 A1 11/2006 Gustavson et al.

OTHER PUBLICATIONS

United States Office Action dated Oct. 23, 2017 in U.S. Appl. No. 15/199,772.
United States Office Action dated Aug. 2, 2019, in co-pending U.S. Appl. No. 16/439,935.

* cited by examiner

SYSTEM, METHOD, AND RECORDING MEDIUM FOR MIRRORING MATRICES FOR BATCHED CHOLESKY DECOMPOSITION ON A GRAPHIC PROCESSING UNIT

CROSS-REFERENCE TO RELATED APPLICATIONS

The present application is a Continuation Application of U.S. patent application Ser. No. 15/199,772, filed on Jun. 30, 2016, the entire contents of which are hereby incorporated by reference.

BACKGROUND

The present invention relates generally to a batched Cholesky decomposition method on a graphics processing unit (GPU), and more particularly, but not by way of limitation, to a system, method, and recording medium for combining two symmetric and positive definite (SPD) matrices into one rectangular (or square) matrix to accelerate batched dense Cholesky decomposition on a GPU by solving both symmetric positive definite matrices (e.g., two problems) at the same.

Rapid evolution of GPUs in performance, architecture, and programmability provides general and scientific computational potential far beyond their primary purpose, graphics processing. Conventionally, Cholesky decomposition has been considered as an algorithm for solving symmetric and positive definite linear systems using the GPU.

Cholesky decomposition is conventionally complex because the process requires three-routines (e.g., square rooting, normalizing, and subtracting inner product or updating a submatrix), the memory access pattern is sub-optimal, and there is a high thread divergence.

Conventional techniques have attempted to improve Cholesky decomposition by, for example, forward and backward substitution, which can be used for various purposes such as for equalization, filtering data, and reconstructing data. Such techniques consider a way to speed up Cholesky decomposition by proposing a Single-Instruction-Multiple-Data (SIMD)-like special functionality, which requires a new-type of hardware or modification to an existing hardware, and does not consider a batched problem.

FIG. 2 exemplary shows a Cholesky decomposition of related art. As shown, updating a global memory 'B' is a problem because global memory is not as efficient for processing as a shared memory 'A' (i.e., on-chip, etc.) because there are fewer valid elements as the steps go from "step" 0 to "step i". Also, there is thread divergence because an update (or no update is based on the step. Further, there is an issue of load balancing as in the thread nearest "X" would do nothing after "step i" is complete and waits until "step 0" completes. This leads to synchronization strain (e.g., for every computation, three synchronizations are needed).

SUMMARY

However, the inventors have realized a non-abstract technical solution to the technical problem to improve a computer-technology (e.g., a performance of a GPU) by accelerating a batch of Cholesky decomposition on a GPU by mirroring and combining two problems (e.g., two symmetric and positive definite (SPD) matrices) to analyze and allocate the read data to a thread and to a problem.

In an exemplary embodiment, the present invention can provided a batched Cholesky decomposition method for a Graphics Processing Unit (GPU) including at least a first problem and a second problem, the method including mirroring a second problem matrix of the second problem to a first problem matrix of the first problem, combining the first problem matrix and the mirrored second problem matrix into a single problem matrix, and allocating data read to a thread and to the first problem and the second problem, respectively.

Further, in another exemplary embodiment, the present invention can provide a non-transitory computer-readable recording medium recording a batched Cholesky decomposition program for a Graphics Processing Unit (GPU) including at least a first problem and a second problem, the program causing a computer to perform: mirroring a second problem matrix of the second problem to a first problem matrix of the first problem, combining the first problem matrix and the mirrored second problem matrix into a single problem matrix, and allocating data read to a thread and to the first problem and the second problem, respectively.

Even further, in another exemplary embodiment, the present invention can provide a batched Cholesky decomposition system for at least a first problem and a second problem on a Graphics Processing Unit (GPU), said system including a processor, and a memory, the memory storing instructions to cause the processor to: mirror a second problem matrix of the second problem to a first problem matrix of the first problem, combine the first problem matrix and the mirrored second problem matrix into a single problem matrix, and allocate data read to a thread and to the first problem and the second problem, respectively.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
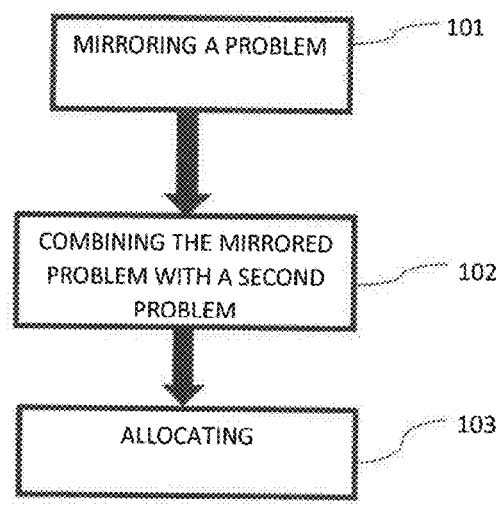
FIG. 1 exemplarily shows a high-level flow chart for a batched Cholesky decomposition method 100.
Figure 2:
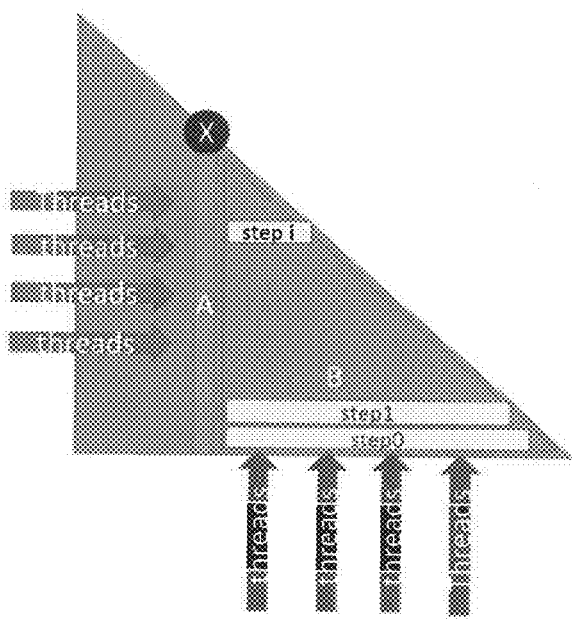
FIG. 2 exemplarily shows a Cholesky decomposition method of a Related Art.

The invention will now be described with reference to FIGS. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the Batched Cholesky decomposition method 100 includes various steps to pair matrices to accelerate batched dense Cholesky decomposition on a GPU. As shown in at least FIG. 6, one or more computers of a computer system 12 can include a memory 28 having instructions stored in a storage system to perform the steps of FIG. 1.

Figure 5:
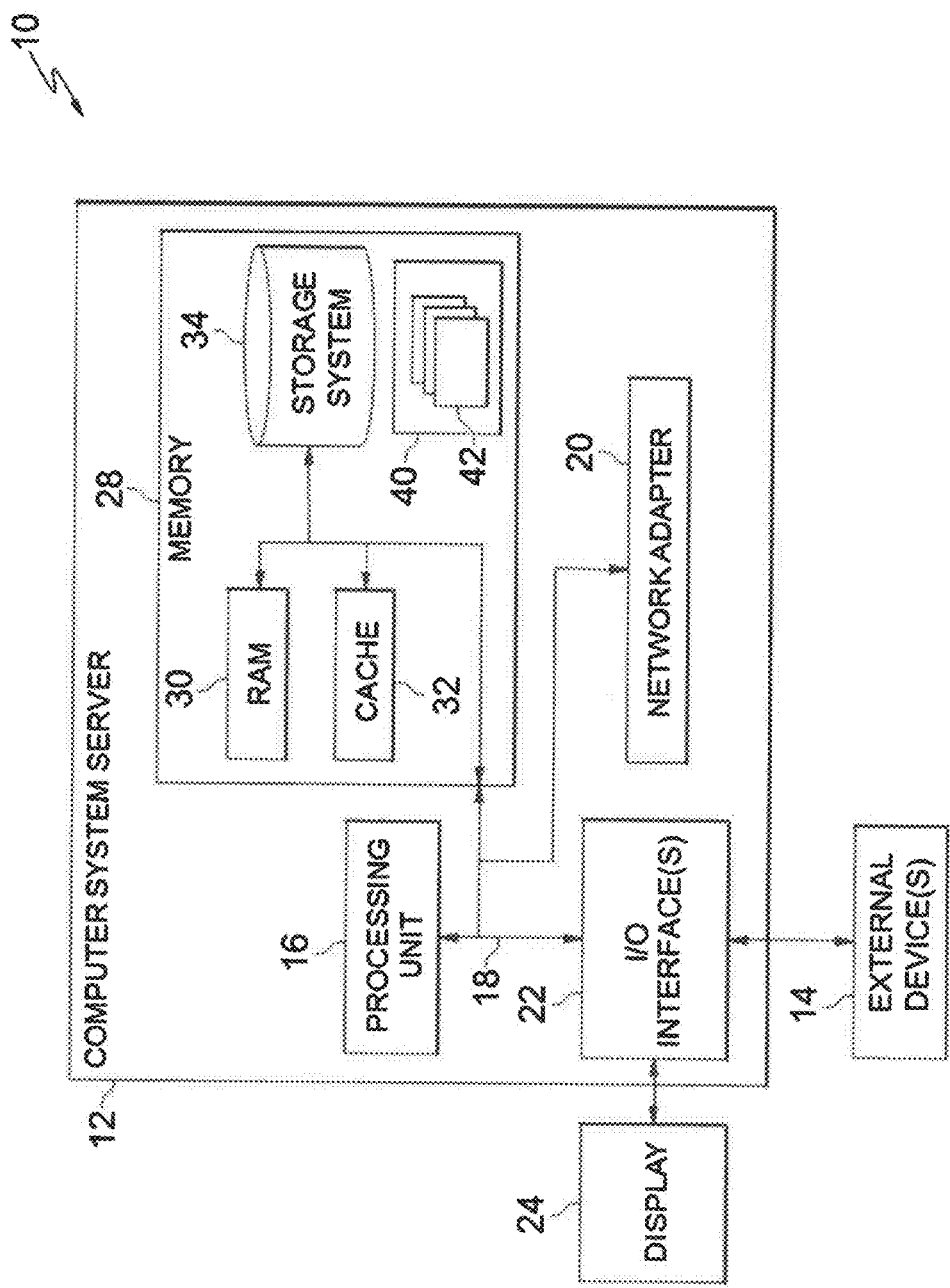
FIG. 5 depicts a cloud-computing node according to an embodiment of the present invention.
Figure 6:
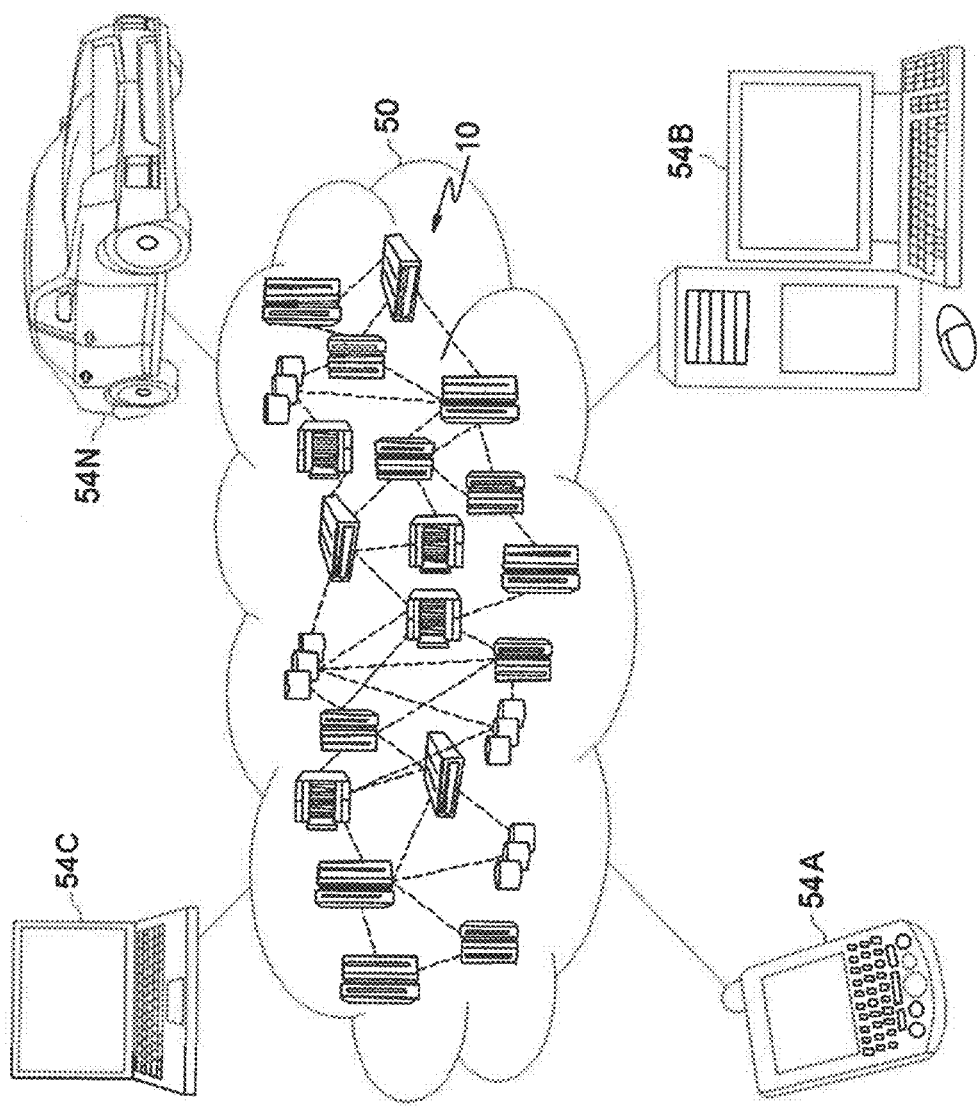
FIG. 6 depicts a cloud-computing environment according to another embodiment of the present invention.
Figure 7:
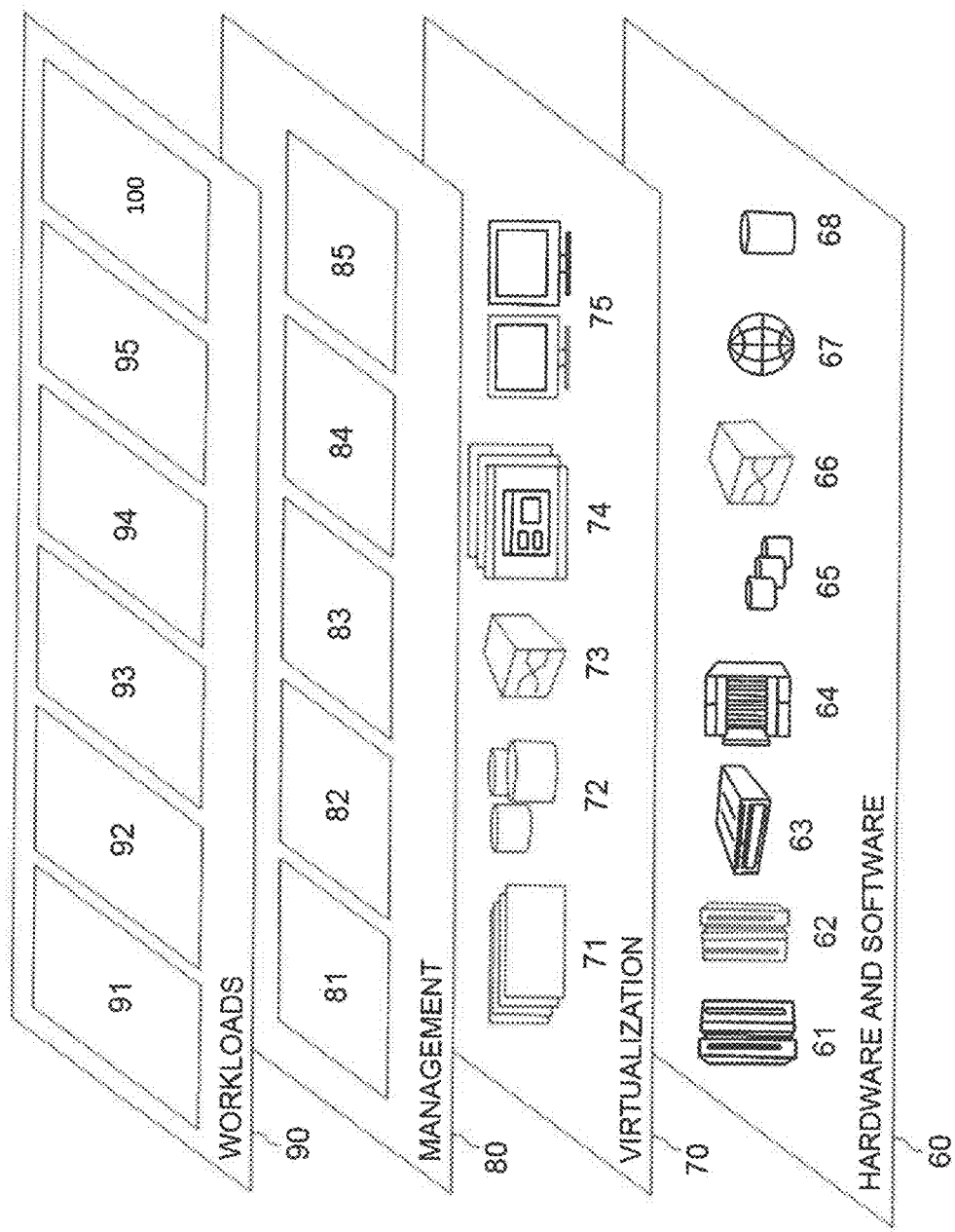
FIG. 7 depicts abstraction model layers according to an embodiment of the present invention.

Although as shown in FIGS. 5-7 and as described later, the computer system/server 12 is exemplarily shown in cloud computing node 10 as a general-purpose computing circuit which may execute in a layer the batched Cholesky decomposition system method (FIG. 6), it is noted that the present invention can be implemented outside of the cloud environment.

The method 100 is used for Cholesky decomposition to solve a linear system on a GPU to solve a batch of problems. The linear system comprises "Ax=B" where A is symmetric and positive definite (e.g., $LL^\wedge$=B). That is, referring to FIG. 3, the batch of problems includes at least a first problem "Problem 1" and a second problem "Problem 2".

That is, the steps of the method 100 are all part of an improved method for batched Cholesky decomposition.

Figure 3:
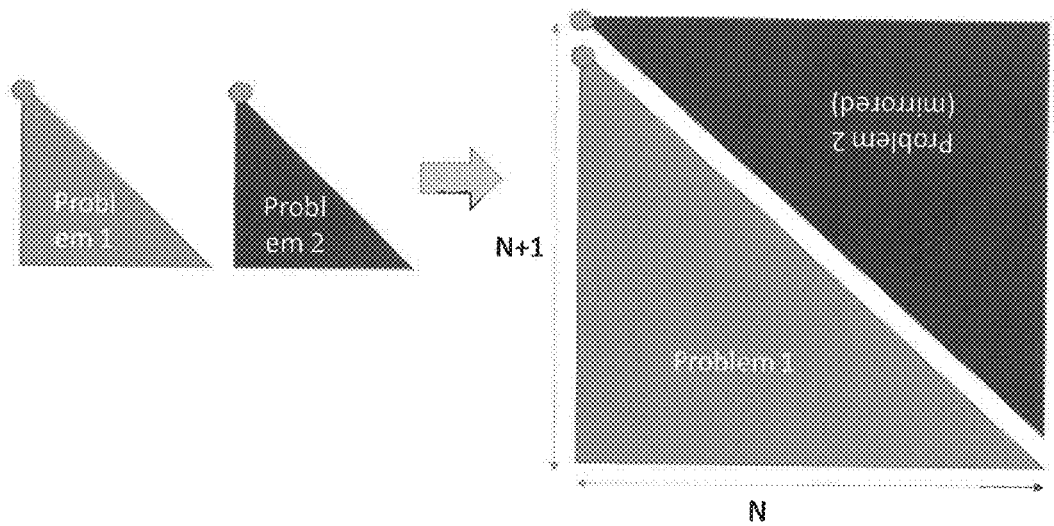
FIG. 3 exemplarily shows an exemplary working embodiment of Steps 101 and 102.

As shown in FIG. 3, Step 101 mirrors (folds) the second problem to the first problem and shifts the second problem by 'N+1'. That is, because the matrices of Cholesky decomposition are symmetrical (e.g., A=LL*), the second problem can be mirrored by Step 101 to provide an acceptable matrix for the Cholesky decomposition. It is noted that "mirroring" or "folding" can be used interchangeably and have the same meaning.

Step 102 combines the first problem and the mirror second problem into a single matrix. The combined matrix comprising the first problem and the mirrored second problem has a memory layout of an (N+1)×N matrix. Step 102 shifts the mirrored second problem by (N+1) such that the memory layout comprises the (N+1)×N matrix (e.g., a rectangular or square matrix). That is, Step 102 combines (e.g., pairs) the first problem and the mirrored second problem into one square matrix when at least two problems are present to be solved.

Figure 4:
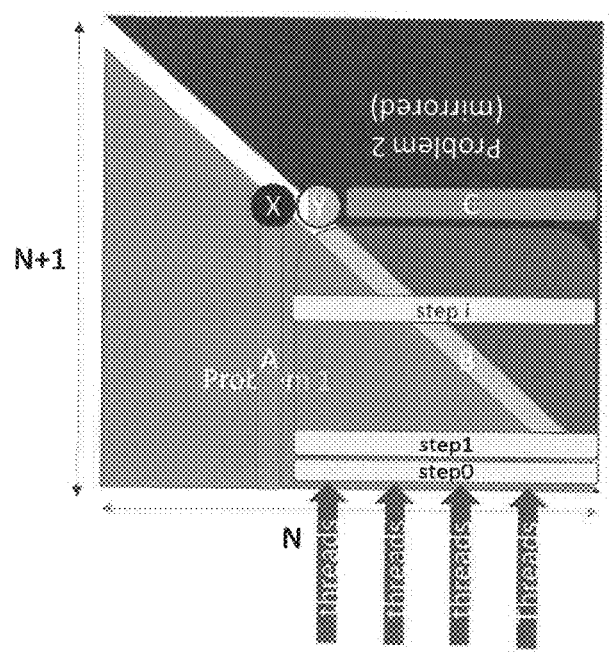
FIG. 4 exemplarily shows an exemplary working embodiment of Step 103 and a working embodiment of the batched Cholesky decomposition method 100.

As shown in FIG. 4, the combined matrix comprises global memory 'B' and shared memory 'A' for the first problem which has regular intervals and shared memory 'C' for the second problem which is continuous. Because Step 102 combines the first problem and the mirrored second problem into a square matrix of (N+1)×N, each thread performs a same amount of work in each step (e.g., each step has a same amount of elements).

Step 103 allocates the data read from the global memory to a thread and to the respective problem (e.g., a thread can include read data from the first problem and the second problem). Once the read data is allocated to the thread, the thread will update the values in the data by performing the Cholesky decomposition algorithm. In other words, the data read from global memory is needed for sub-matrix update which is the last step for a given "X" or "Y" diagonal element.

Thereby, mirroring (folding) the second problem matrix and combining the mirrored second problem matrix with the first problem matrix as above, Step 103 can read the fixed size data length with a fixed data interval for both problems, instead of reading twice for each problem in an irregular fashion.

That is, each step includes elements of global memory from the first problem and the second problem because each step is a same size as a result of the combined problems. Step 103 reads all data in the steps and allocates which problem that the read data belongs (e.g., each thread has an equal amount of work to do during the Cholesky decomposition). When the Cholesky decomposition algorithm is performed on the read data, the threads update the values of the steps. Also, Step 103 does not discard data and does not have to wait for steps to be read because all data is read at a same time. Thus, there is no idle time.

Further, the method 100 requires only a single synchronization for every two problems when the Cholesky decomposition algorithm is performed (e.g., 50% reduction in synchronization and divergence when compared to conventional techniques). In addition, because each step has a same number of elements, each thread has a same number of processes to perform in Step 103 when allocating the data read from the global memory thereby increasing a global memory efficiency. That is, there are no idle time of threads when the Cholesky decomposition algorithm is performed on the global memory data.

For example, on a k40m GPU with 20,000 problems, the method 100 has a 3.3-times increase in speed over Net_64 (e.g., 0.73 to 0.22) and a 10-times increase in speed over Yahoo_64 (e.g., 0.95 to 0.095).

It is noted that the method 100 can be implemented on a standard ("off-the-shelf") GPU without any hardware modifications to the GPU.

Exemplary Hardware Aspects, Using a Cloud Computing Environment

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are hound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 5, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the anti-counterfeiting system 100 and the anti-counterfeiting system 600 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A batched Cholesky decomposition method for a Graphics Processing Unit (GPU), the method comprising:
   increasing a speed of performing a Cholesky decomposition on the GPU by:
      mirroring a second problem matrix of a second problem to a first problem matrix of a first problem as paired matrices and shifting the second problem matrix by N+1;
      combining the first problem matrix and the mirrored second problem matrix into one matrix of (N+1)×N by merging the first problem matrix and the mirror second problem matrix; and
      reading a fixed size data length of the one square matrix with a fixed data interval for both the first problem and the second problem,
   wherein the first problem matrix and the second problem matrix are symmetric and positive definite matrices.

2. The method of claim 1, wherein each step of the Cholesky decomposition includes elements of a global memory from the first problem and the second problem, and
   wherein said each step is a same size.

3. The method of claim 1, wherein the one matrix comprises a global memory for the first problem and the second problem.

4. The method of claim 3, wherein the one matrix comprises a first problem shared memory and a second problem shared memory.

5. The method of claim 4, wherein the first problem shared memory comprises regular intervals, and
   wherein the second problem shared memory is continuous.

6. The method of claim 1, further comprising allocating data read to a thread and to the first problem and the second problem, respectively.

7. The method of claim 6, wherein the allocating allocates the data read to a plurality of threads.

8. The method of claim 7, wherein each thread of the plurality of threads performs a same amount of work during the Cholesky decomposition.

9. The method of claim 7, wherein the plurality of threads are not idle.

10. The method of claim 6, wherein, after the allocating allocates the read data to the thread for each of the first problem and the second problem, the thread updates values in the data.

11. The method of claim 6, wherein the allocating assesses the read data such that the read data is not discarded.

12. The method of claim 1, wherein the mirroring shifts the mirror second problem matrix by N+1 such that the single problem matrix comprises a square matrix or a rectangular matrix.

13. The method of claim 1, further comprising performing a single synchronization for the first problem and the second problem.

14. The method of claim 1, wherein the data read by Cholesky decomposition is read for the first problem and the second problem at a same time.

15. The method a claim 1, wherein each step of the Cholesky decomposition of the one matrix has a same number of elements.

16. A non-transitory computer-readable recording medium recording a batched Cholesky decomposition program for a Graphics Processing Unit (CPU), the program causing a computer to perform:
   increasing a speed of performing a Cholesky decomposition on the GPU by:
      mirroring a second problem matrix of a second problem to a first problem matrix of a first problem as paired matrices and shifting the second problem matrix by N+1;
      combining the first problem matrix and the mirrored second problem matrix into one matrix of (N+1)×N by merging the first problem matrix and the mirror second problem matrix; and
      reading a fixed size data length of the one square matrix with a fixed data interval for both the first problem and the second problem,
   wherein the first problem matrix and the second problem matrix are symmetric and positive definite matrices.

17. The non-transitory computer-readable recording medium of claim 16, wherein each step of the Cholesky decomposition includes elements of a global memory from the first problem and the second problem, and
   wherein said each step is a same size.

18. The non-transitory computer-readable recording medium of claim 16, wherein the one matrix comprises a global memory for the first problem and the second problem.

19. A batched Cholesky decomposition system on a Graphics Processing Unit (GPU), said system comprising:
   a processor; and
   a memory; the memory storing instructions to cause the processor to:
      increasing a speed of performing a Cholesky decomposition on the GPU by:
         mirroring a second problem matrix of a second problem to a first problem matrix of a first problem as paired matrices and shifting the second problem matrix by N+1;
         combining the first problem matrix and the mirrored second problem matrix into one matrix of (N±1)×N by merging the first problem matrix and the mirror second problem matrix; and
         reading a fixed size data length of the one square matrix with a fixed data interval for both the first problem and the second problem,
      wherein the first problem matrix and the second problem matrix are symmetric and positive definite matrices.

20. The system of claim 19, wherein each step of the Cholesky decomposition includes elements of a global memory from the first problem and the second problem, and
   wherein said each step is a same size.

* * * * *